(12) United States Patent
Son

(10) Patent No.: US 7,391,174 B2
(45) Date of Patent: Jun. 24, 2008

(54) BRUSHLESS DC MOTOR CONTROL APPARATUS AND CONTROL METHOD THEREOF

(75) Inventor: Yeon-ho Son, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 11/340,625

(22) Filed: Jan. 27, 2006

(65) Prior Publication Data
US 2007/0080654 A1  Apr. 12, 2007

(30) Foreign Application Priority Data
Oct. 10, 2005  (KR)  ............... 10-2005-0094976

(51) Int. Cl.
*H02P 6/00*  (2006.01)

(52) U.S. Cl. ............... 318/400.01; 318/400.03; 318/400.04; 318/400.06; 318/607; 318/608

(58) Field of Classification Search ......... 318/254, 318/138, 439, 400.01, 400.03, 400.04, 400.06, 318/607, 608
See application file for complete search history.

(56) References Cited

U.S. PATENT DOCUMENTS

| | | | |
|---|---|---|---|
| 4,642,539 A | | 2/1987 | Hinds |
| 4,686,437 A | * | 8/1987 | Langley et al. ......... 318/400.01 |
| 4,772,831 A | | 9/1988 | Casler, Jr. et al. |
| 4,855,652 A | * | 8/1989 | Yamashita et al. ......... 318/268 |
| 4,879,498 A | * | 11/1989 | Shinohara et al. ......... 318/254 |
| 4,922,169 A | * | 5/1990 | Freeman ............. 318/254 |
| 5,019,756 A | * | 5/1991 | Schwarz ............ 318/254 |

(Continued)

FOREIGN PATENT DOCUMENTS

DE  102 187 773 A1  12/2002

(Continued)

OTHER PUBLICATIONS

German Office Action dated Nov. 26, 2007 issued in DE 2006-003151.2-32.

(Continued)

*Primary Examiner*—Rita Leykin
(74) *Attorney, Agent, or Firm*—Stanzione & Kim, LLP

(57) ABSTRACT

The invention relates to a brushless DC motor control apparatus controlling the number of revolutions of a brushless DC motor having a rotor with n poles (where n is a natural number) that rotates due to a supply current with m phases (where m is a natural number) supplied to a stator, comprising: a rotation detector part, which counts the number of revolution pulses from the brushless DC motor caused by the rotation of the rotor, a revolution requirement amount input part, which receives the number of revolutions of the brushless DC motor as input and converts it to a corresponding revolution requirement amount, a comparison part, which compares the number of revolution pulses and the revolution requirement amount, and a current controller part, which controls the supply current supplied to the brushless DC motor according to comparison results from the comparison part. The number of revolutions can be controlled through a digitalized method by detecting and counting counter electromotive forces on a sensorless type brushless DC motor or F/G pulses from a sensor type brushless DC motor.

14 Claims, 6 Drawing Sheets

U.S. PATENT DOCUMENTS

| | | | | |
|---|---|---|---|---|
| 5,057,753 | A | * | 10/1991 | Leuthold et al. ........ 318/400.35 |
| 5,068,562 | A | * | 11/1991 | Tagami et al. ................ 310/256 |
| 5,189,349 | A | * | 2/1993 | Haga ........................... 318/254 |
| 5,220,257 | A | * | 6/1993 | Yoshino et al. ......... 318/400.03 |
| 5,220,259 | A | * | 6/1993 | Werner et al. ................ 318/432 |
| 5,320,412 | A | | 6/1994 | Eakins et al. |
| 5,689,159 | A | * | 11/1997 | Culp et al. ............. 318/400.18 |
| 6,953,013 | B2 | * | 10/2005 | Tani ......................... 123/90.17 |
| 2004/0135534 | A1 | | 7/2004 | Cullen |

FOREIGN PATENT DOCUMENTS

| | | |
|---|---|---|
| DE | 103 47 208 A1 | 5/2004 |
| EP | 429 412 A2 | 5/1991 |
| EP | 0921630 A2 | 6/1999 |
| EP | 1 495 942 A1 | 1/2005 |
| KR | 1998-0013970 | 5/1998 |
| KR | 2004-18716 | 3/2004 |

OTHER PUBLICATIONS

Korean Office Action dated Nov. 10, 2006 issued in KR 2005-94976.
Finnish Patent Office Action dated Sep. 8, 2006 issued in KR 2005-94976.
German Office Action dated Sep. 20, 2006 issued in DE 10 2006 003 151.2-32.

* cited by examiner

BRUSHLESS DC MOTOR CONTROL APPARATUS AND CONTROL METHOD THEREOF

CROSS-REFERENCE TO RELATED APPLICATIONS

This application claims the benefit of Korean Patent Application No. 2005-94976 filed with the Korea Industrial Property Office on Oct. 10, 2005, the disclosure of which is incorporated herein by reference.

BACKGROUND OF THE INVENTION

1. Field of the Invention

The present invention relates to a DC motor, and in particular, to a brushless DC motor control apparatus and control method thereof.

2. Description of the Related Art

The motor is a kind of energy conversion device, which converts electric energy to rotational or linear kinetic energy by means of electromagnetic phenomena. With the expansion of its fields of application due to the widespread use of electronic equipment in the electric, electronic, and mechanical industries, the importance of the motor is increasing as a critical source of driving power. In addition, with the rapid growth of the industries, motors as driving sources are being created with faster speeds and greater capacities.

In particular, precision control motors provide precision movement with fast response times and wide ranges in speed control. These motors are operated according to control signals by repeating stop, start, and reverse actions, etc. Precision control motors are continually increasing in importance with the advance of technology and expansion of application fields such as advances in power electronics, advances in microcomputers, practical application of precision technology and high performance permanent magnets, and advances in surface mounting technology.

Examples of precision control motors include stepping motors and brushless DC motors, which usually use high performance permanent magnets.

The motor used most often for positioning control is the stepping motor. In the precision control of mechanical displacement in general, stepping motors are suitable for use in micoms because they allow digitalized control by using pulses. Stepping motors can provide rotation of a specified angle and can stop with a high level of precision without feedback for detecting the position of the motor shaft. Also, stepping motors can allow open loop control, provide easy control with digital signals, and have a maintenance torque when stopping.

However, the torque is low in these motors, so that they are difficult to apply in fields requiring high torque. Also, vibration and resonance phenomena are likely to appear at certain frequencies, they are weak against loads with inertia, and stepping out occurs during high-speed operations. Further, since a sufficient current cannot flow through the wound coils due to the inductance effect of the wound coils during operation with a common driver, the torque is reduced with increasing pulse rate to yield a lower efficiency as compared to a DC motor.

Thus, the brushless DC motor, which provides high torque, is preferred in controlling the position or the number of revolutions. Not only is the brushless DC motor durable and efficient, it allows for easy use in constant speed and variable speed control.

The brushless DC motor is devised without the brush, which acts as a commutator, while maintaining the properties of a DC motor, and can be classified as a sensor type or a sensorless type according to whether or not it has a sensor which detects both the position of the rotor and the rotation speed.

In a published Korean patent application no. 1998-0013970, a "positioning control method of a sensorless BLDC motor" is disclosed. It relates to a BLDC motor, wherein the counter electromotive forces generated on the stator by the rotor of the motor are detected, and pulses are divided into a multiple number, as these counter electromotive forces are compared with a standard voltage. The pulses are counted to determine the accurate position of the rotor of the motor with regard to the normal position of the rotor in the motor, and corresponding control signals are outputted to provide accurate positioning control.

This positioning control based on the control signals are for controlling the rotational position of the rotor of the motor, and cannot control the number of revolutions of the rotor.

SUMMARY OF THE INVENTION

To achieve the foregoing objectives, an aspect of the present invention provides a brushless DC motor control apparatus and control method thereof which can control the number of revolutions using a sensorless type or a sensor type brushless DC motor.

Another aspect of the invention provides a brushless DC motor control apparatus and control method thereof wherein the number of revolutions are controlled through a digitalized method by detecting and counting counter electromotive forces on a sensorless type brushless DC motor.

Another aspect of the invention provides a brushless DC motor control apparatus and control method thereof wherein the number of revolutions are controlled through a digitalized method by detecting and counting F/G pulses from a sensor type brushless DC motor.

Other aspects of the invention will be appreciated through the explanations set forth below.

Additional aspects and advantages of the present general inventive concept will be set forth in part in the description which follows and, in part, will be obvious from the description, or may be learned by practice of the general inventive concept.

To overcome the foregoing problems, an embodiment of the invention may provide a brushless DC motor control apparatus controlling the number of revolutions of a brushless DC motor having a rotor with n poles (where n is a natural number) that rotates due to a supply current with m phases (where m is a natural number) supplied to a stator, comprising: a rotation detector part, which counts the number of revolution pulses from the brushless DC motor caused by the rotation of the rotor; a revolution requirement input part, which receives the number of revolutions of the brushless DC motor as input and converts it to a corresponding revolution requirement amount; a comparison part, which compares the number of revolution pulses and the revolution requirement amount; and a current controller part, which controls the supply current supplied to the brushless DC motor according to comparison results from the comparison part.

Preferably, the current controller part may control the supply current so as to rotate the brushless DC motor when the number of revolution pulses is smaller than the revolution requirement amount or may control the supply current so as to stop the brushless DC motor when the number of revolution pulses is equal to the revolution requirement amount.

The brushless DC motor may be a sensorless type, and the rotation detector part may count the total number of detections of counter electromotive force generated on a multiphase coil of the stator as the number of revolution pulses. Here, the revolution requirement amount may be (the number of revolutions)×(the total number of counter electromotive forces generated during one revolution of the brushless DC motor).

On the other hand, the brushless DC motor may be a sensor type, and the rotation detector part may comprise a magnetic sensor, which senses F/G pulses generated by the rotation of the rotor, and may count the total number of detections of the F/G pulses as the number of revolution pulses. Here, the revolution requirement amount may be (the number of revolutions)×(the total number of F/G pulses generated during one revolution of the brushless DC motor).

Also, the current controller part may supply the supply current which activates the brushless DC motor after the number of revolutions is inputted to the revolution requirement input part.

Further, the current controller part may comprise a multiphase inverter for supplying the supply current with m phases to the brushless DC motor.

To achieve the foregoing objectives, another aspect of the present invention may provide a method of controlling a brushless DC motor having a rotor with n poles (where n is a natural number) that rotates due to a supply current with m phases (where m is a natural number) supplied to a slot of a stator, comprising: (a) receiving as input the number of revolutions of the brushless DC motor; (b) converting the number of revolutions to a revolution requirement amount; (c) supplying a first supply current which activates the brushless DC motor; (d) counting the number of revolution pulses caused by the rotation of the brushless DC motor; (e) comparing the revolution requirement amount and the number of revolution pulses; and (f) supplying a second supply current to the brushless DC motor according to the comparison results of the comparing (operation e).

Preferably, the supplying of the second supply current (operation f) may involve supplying the second supply current which rotates the brushless DC motor when the number of revolution pulses is smaller than the revolution requirement amount, and having the counting (operation d) and the comparing (operation e) repeated, or may involve supplying the second supply current which stops the brushless DC motor when the number of revolution pulses is equal to the revolution requirement amount.

Also, the brushless DC motor may be a sensorless type, and the counting (operation d) may involve counting the total number of detections of counter electromotive force generated on a multiphase coil of the stator as the number of revolution pulses. Here, the revolution requirement amount may be (the number of revolutions)×(the total number of counter electromotive forces generated during one revolution of the brushless DC motor).

On the other hand, the brushless DC motor may be a sensor type, and the counting (operation d) may involve counting the total number of detections of the F/G pulses generated on a multiphase coil of the stator as the number of revolution pulses. Here, the revolution requirement amount may be (the number of revolutions)×(the total number of F/G pulses generated during one revolution of the brushless DC motor).

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
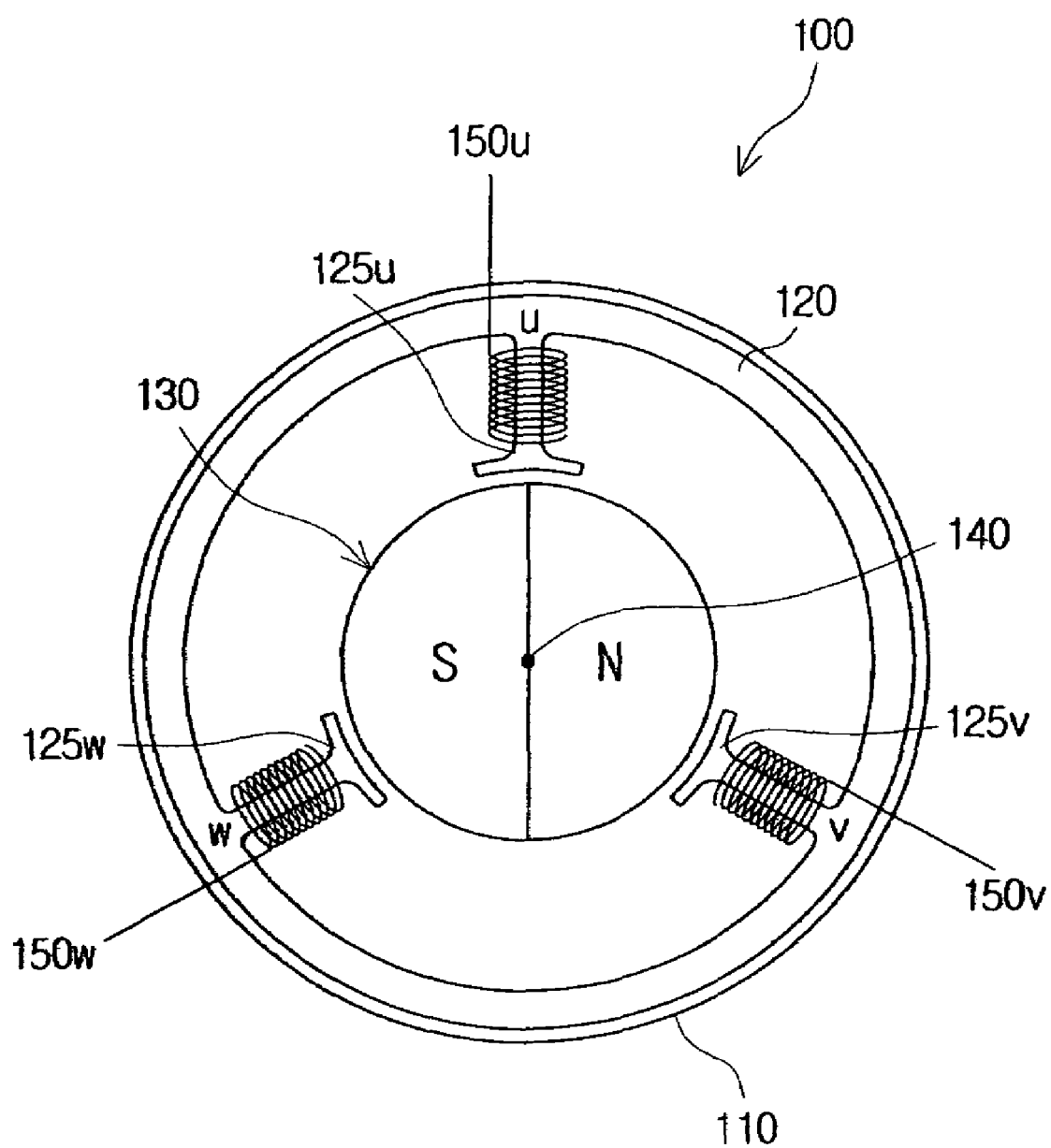
FIG. 1 is a horizontal cross section illustrating a sensorless type brushless DC motor according to a preferred embodiment of the invention.

The descriptions set forth below merely illustrate the principles of the present invention. Therefore, those skilled in the art could devise various methods and apparatus thereof which realize the principles of the present invention and which do not depart from the spirit and scope of the present invention, even though they may not be clearly explained or illustrated in the present specification. Also, it is to be appreciated that not only the principles, viewpoints, and embodiments of the present invention, but all detailed descriptions listing the particular embodiments are intended to include structural and functional equivalents.

Other objectives, particular advantages, and novel features of the present invention will further be clarified by the detailed descriptions and preferred embodiments set forth below with reference to the accompanying drawings. In the describing the invention, detailed explanation of the prior art will be omitted when it is deemed to unnecessarily obscure the crux of the invention. Numerals used in the descriptions (for example, a first, a second, etc.) are merely used to distinguish equal or similar items in an ordinal manner.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a horizontal cross section illustrating a sensorless type brushless DC motor according to a preferred embodiment of the invention. FIG. 1 illustrates a regular inner rotor type sensorless type brushless DC motor with three phases and two poles.

The sensorless type brushless DC motor 100 comprises a casing 110, a stator 120, a rotor 130, and a rotational axis 140.

The casing 110 is generally cylindrical, but of course, other shapes may be used.

The stator 120 is located inside the casing 110, and comprises three-phase coils (a U-phase coil 150$u$, a V-phase coil 150$v$, a W-phase coil 150$w$) wound on a plurality of (three, in the present example) T-shaped teeth(125$u$, 125$v$, 125$w$, hereinafter referred to as 125). The plurality of teeth 125 are extended along the direction of the axis, and an equal number of slot openings are positioned between each tooth 125 through which the three-phase coils are wound.

The rotor 130 is located inside the casing 110, is rotatably inserted and secured at an inner position of each tooth 125 of the stator 120, and comprises a permanent magnet wherein different poles (an N pole and an S pole, in the present example) are positioned to alternate with respect to the rotational axis 140.

When a three-phase supply current is supplied to the three-phase coils, i.e. the U-phase coil 150u, V-phase coil 150v, and W-phase coil 150w, the rotor 130 composed of a permanent magnet with a plurality of poles rotates about the rotational axis 140 as torque is generated according to Fleming's Left Hand Rule.

The tooth 125u around which the U-phase coil 150u is wound faces the N pole and the S pole once each during one revolution of the rotor 130, so that counter electromotive force is generated twice on the U-phase coil 150u. This is also true for the V-phase coil 150v and the W-phase coil 150w.

Therefore, during one revolution of the rotor 130, a total of six counter electromotive forces occur on the U-phase coil 150u, V-phase coil 150v, and W-phase coil 150w. In other words, the number of revolutions of the rotor 130 of the sensorless brushless DC motor 100 may be determined by first adding the numbers of counter electromotive forces generated on the U-phase coil 150u, V-phase coil 150v, and W-phase coil 150w, and then dividing by 6.

As the stator 120 uses a three-phase induced current, the plurality of teeth 125 are formed in multiples of 3, and as the rotor 130 uses a permanent magnet with alternating N and S poles, the poles are formed in multiples of 2. In other words, the ratio of the number of teeth 125 on the stator 120 to the number of poles on the rotor 130 is 3a:2b (where a and b are natural numbers). During one revolution of the rotor 130, the number of counter electromotive forces on each tooth 125 of the stator 120 is 2b, and since the number of teeth 125 on the stator 120 is 3a, the number of counter electromotive forces generated on the sensorless type brushless DC motor 100 during one revolution of the rotor 130 is 6ab.

Figure 2:
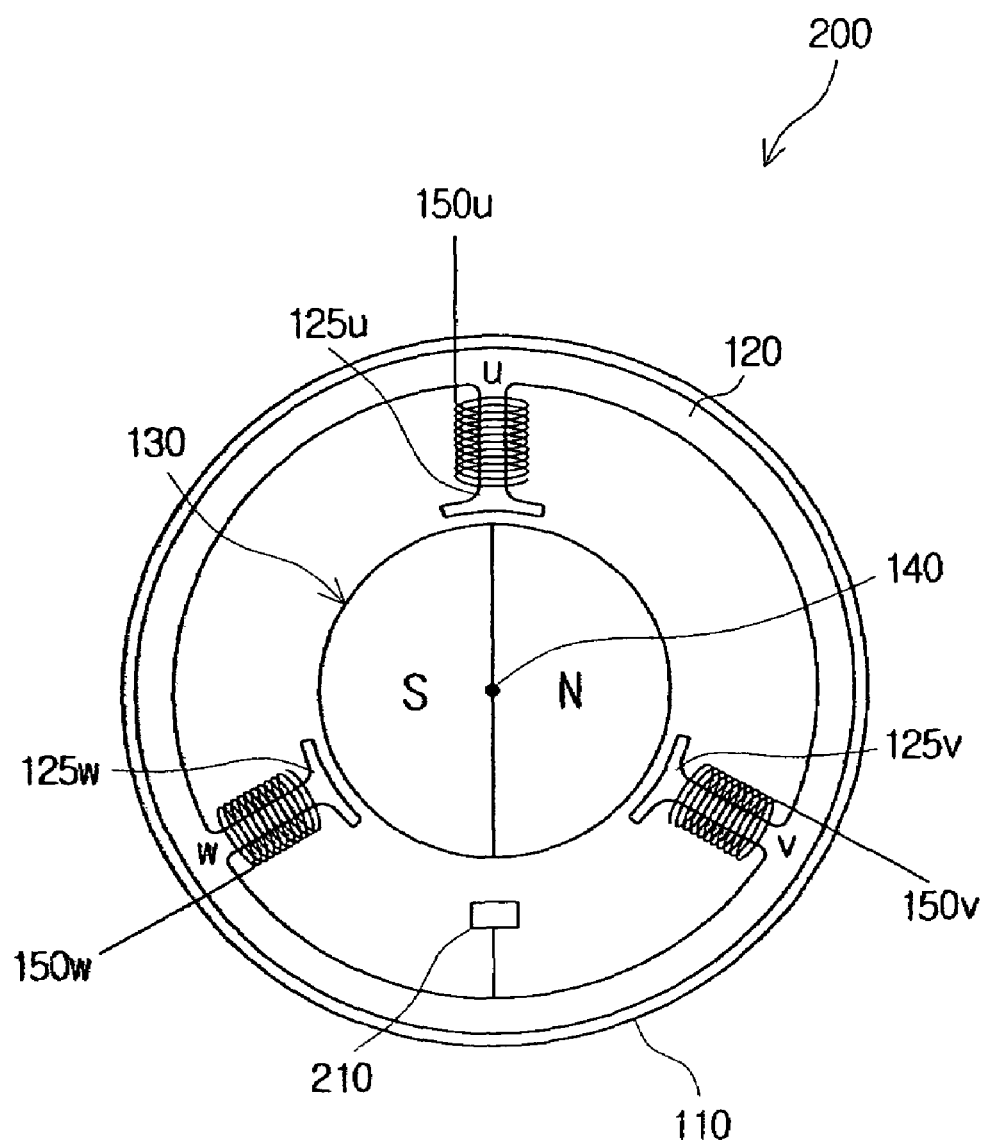
FIG. 2 is a horizontal cross section illustrating a sensor type brushless DC motor according to another preferred embodiment of the invention.

FIG. 2 is a horizontal cross section illustrating a sensor type brushless DC motor according to another preferred embodiment of the invention. FIG. 2 illustrates a regular inner rotor type sensor type brushless DC motor with three phases and two poles.

The sensor type brushless DC motor 200 comprises a casing 110, a stator 120, a rotor 130, a rotational axis 140, and a magnetic sensor 210.

The casing 110 is generally cylindrical, but of course, other shapes may be used.

The stator 120 is located inside the casing 110, and comprises three-phase coils (a U-phase coil 150u, a V-phase coil 150v, a W-phase coil 150w) wound on a plurality of (three, in the present example) T-shaped teeth 125. The plurality of teeth 125 are extended along the direction of the axis, and an equal number of slot openings are positioned between each tooth 125 through which the three-phase coils are wound.

The rotor 130 is located inside the casing 110, is rotatably inserted and secured at an inner position of each tooth 125 of the stator 120, and comprises a permanent magnet wherein different poles (an N pole and an S pole, in the present example) are positioned to alternate with respect to the rotational axis 140.

When a three-phase supply current is supplied to the three-phase coils, i.e. the U-phase coil 150u, V-phase coil 150v, and W-phase coil 150w, the rotor 130 composed of a permanent magnet with a plurality of poles rotates about the rotational axis 140 as torque is generated according to Fleming's Left Hand Rule.

The magnetic sensor 210 located inside the casing 110 detects the position of the rotor 130. It may be positioned in a space between two teeth 125, as shown in FIG. 2, or may be positioned on each tooth 125. From its location, the magnetic sensor 210 senses the proximity of the N pole and the S pole according to the rotation of the rotor 130 and generates F/G pulses (Frequency Generator pulses).

In the present embodiment, the magnetic sensor 210 faces the N pole and S pole once each to generate one F/G pulse. In other words, one revolution of the rotor 130 of the sensor type brushless DC motor 200 can be deduced from the detection of one F/G pulse.

As the stator 120 uses a three-phase induced current, the plurality of teeth 125 are formed in multiples of 3, and as the rotor 130 uses a permanent magnet with alternating N and S poles, the poles are formed in multiples of 2. In other words, the ratio of the number of teeth 125 on the stator 120 to the number of poles on the rotor 130 is 3a:2b (where a and b are natural numbers). The number of F/G pulses generated by the magnetic sensor 210 during one revolution of the rotor 130 is b.

Here, the magnetic sensor 210 may be a hall element.

The brushless DC motor control apparatus of the present invention controls the number of revolutions of a brushless DC motor. The brushless DC motor control apparatus comprises a rotation detector part, a revolution requirement amount input part, a comparison part, and a current controller part.

The rotation detector part counts the number of revolution pulses caused by the rotation of the rotor of the brushless DC motor. In the case of a sensorless type brushless DC motor, the number of revolution pulses is the number of counter electromotive forces detected on the multiphase coils, and in the case of a sensor type, the number of revolution pulses is the number of F/G pulses detected from the magnetic sensor.

The revolution requirement amount input part receives the desired number of revolutions of the brushless DC motor from the user as input. Then, it converts the inputted number of revolutions to a corresponding revolution requirement amount. The conversion formula will be discussed below in detail with reference to FIG. 3 and FIG. 4.

The comparison part compares the number of revolution pulses from the rotation detector part and the revolution requirement amount from the revolution requirement amount input part.

The current controller part controls the supply current supplied to the brushless DC motor according to comparison results from the comparison part. The brushless DC motor continues to rotate at a constant speed or stops according to the supply current.

To stop the brushless DC motor, the rotation of the rotor is halted either by making the supply current zero or by making the multiphase current supplied to each stator forming the brushless DC motor all equal.

Hereinafter, the brushless DC motor control apparatus will be discussed in detail; the sensorless type with reference to FIG. 3, and the sensor type with reference to FIG. 4.

Figure 3:
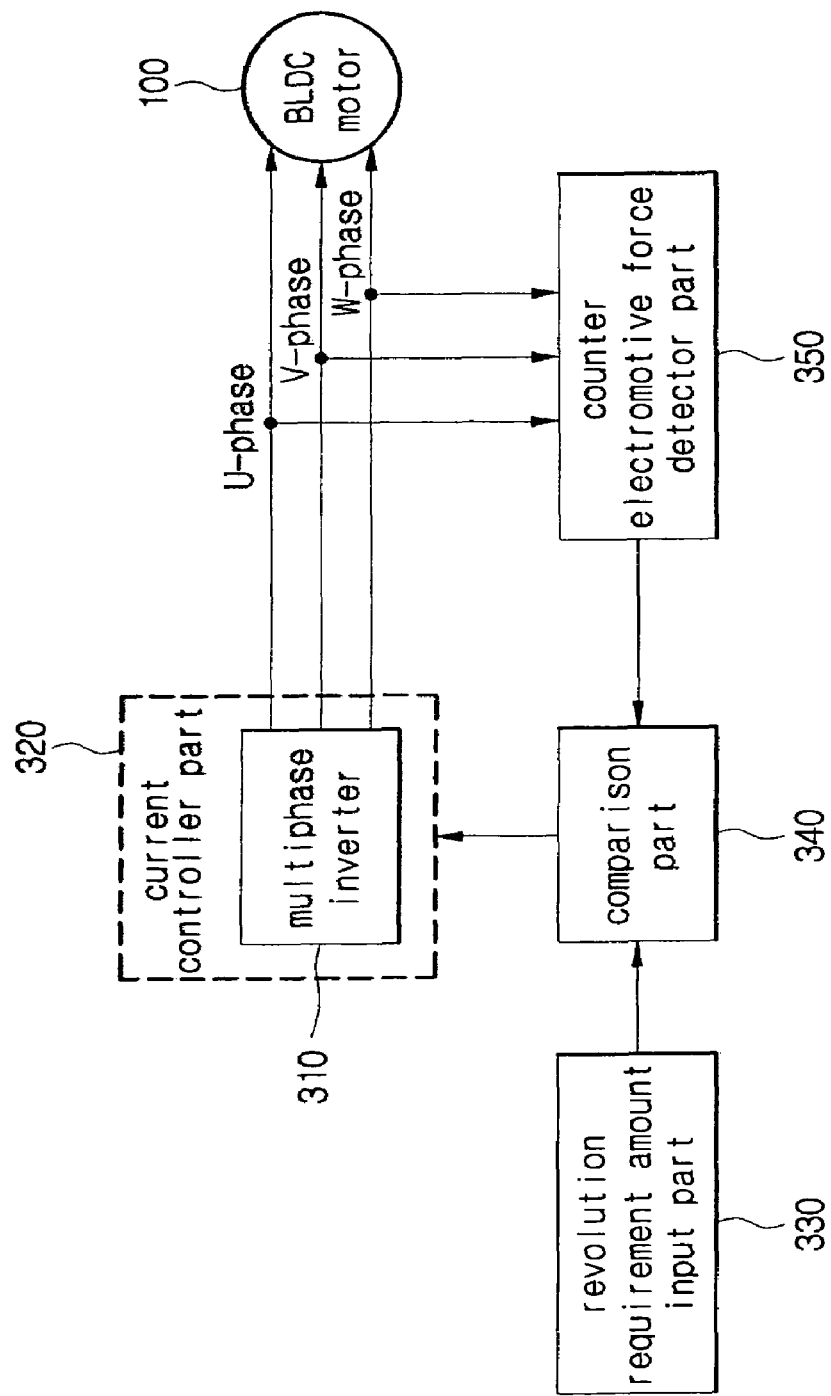
FIG. 3 is a schematic diagram illustrating a control apparatus of a sensorless type brushless DC motor according to a preferred embodiment of the invention.

FIG. 3 is a schematic diagram illustrating a control apparatus of a sensorless type brushless DC motor according to a preferred embodiment of the invention. As shown in FIG. 3, the control apparatus comprises a sensorless type brushless DC motor 100, a current controller part 320, a revolution requirement amount input part 330, a comparison part 340, and a counter electromotive force detector part 350.

The sensorless type brushless DC motor 100, as illustrated in FIG. 1, comprises a stator 120 and a rotor 130, and rotates the rotor 130 according to Fleming's Left Hand Rule using a multiphase supply current supplied from the current controller part 320. Due to the rotation of the rotor 130, counter electromotive forces are generated on the multiphase coils wound around the stator 120. The sensorless brushless DC motor can be realized in various forms, for example with the stator 120 receiving a pairs of three-phase supply currents, and the rotor 130 having b pairs of the two poles, etc.

The explanations below will be based on the regular three-phase bipolar form shown in FIG. 1. However, it is to be appreciated that the scope of the invention is not limited to this case.

The counter electromotive force detector part 350 corresponds to the rotation detector part. The counter electromotive force detector part 350 detects the counter electromotive forces generated from the sensorless type brushless DC motor 100. The counter electromotive forces occur twice respectively on the three T-shaped teeth 125 on the stator of the sensorless type brushless DC motor 100. The tooth 125$u$ around which the U-phase coil 150$u$ is wound faces the N pole and S pole of the rotor 130 once each, during one revolution of the rotor 130, so that counter electromotive force is generated twice on the U-phase coil 150$u$. This is also true for the V-phase coil 150$v$, and the W-phase coil 150$w$.

Therefore, during one revolution of the rotor 130, a total of six counter electromotive forces occur on the U-phase coil 150$u$, V-phase coil 150$v$, and W-phase coil 150$w$.

The counter electromotive forces generated on the U-phase coil 150$u$, V-phase coil 150$v$, and W-phase coil 150$w$ according to the movement of the N pole and S pole are generated with time intervals, and the counter electromotive forces are generated sequentially with such time intervals.

The counter electromotive force detector part 350 increases a measured counter electromotive force pulse number with each occurrence of counter electromotive force and calculates the measured counter electromotive force pulse number as the number of counter electromotive forces measured up to the present. Then, it is preferable that when the sensorless type brushless DC motor 100 is stopped, the measured counter electromotive force pulse number is reset to its initial value, so that when the sensorless type brushless DC motor 100 is rotated again, it is increased from the beginning to count a new measured counter electromotive force pulse number.

The revolution requirement amount input part 330 receives the required number of revolutions of the sensorless type brushless DC motor 100 as input from the user. With the sensorless type brushless DC motor 100 illustrated in FIG. 1, six occurrences of counter electromotive force are sensed sequentially with equal time intervals. Thus, the revolution requirement amount input part 330 receives the required number of revolutions as input and converts it to a required counter electromotive force pulse number for comparing by the comparison part 340. The required counter electromotive force pulse number is equal to (the inputted number of revolutions)×(the total number of counter electromotive forces currently sensed during one revolution of the sensorless type brushless DC motor). Other formulas may also be used.

The above conversion may be performed by the comparison part 340, to which the number of revolutions is inputted, and not the revolution requirement amount input part 330.

The comparison part 340 receives the measured counter electromotive force pulse number as input from the counter electromotive force detector part 350, receives the required counter electromotive force pulse number as input from the revolution requirement amount input part 330, and compares the two values.

The current controller part 320 receives the comparison result from the comparison part 340 and supplies to the sensorless type brushless DC motor 100 a supply current which controls the rotation of the sensorless type brushless DC motor 100.

If the measured counter electromotive force pulse number is smaller than the required counter electromotive force pulse number according to the comparison results from the comparison part 340, then the sensorless type brushless DC motor 100 has not yet rotated up to the requirement of the user, so that the current controller part 320 supplies a supply current to the sensorless type brushless DC motor 100 that makes the sensorless type brushless DC motor 100 continue to rotate.

If the measured counter electromotive force pulse number is greater than or equal to the required counter electromotive force pulse number according to the comparison results from the comparison part 340, then the sensorless type brushless DC motor 100 has rotated up to the requirement of the user, so that the current controller part 320 either supplies a stop current that makes the sensorless type brushless DC motor 100 stop immediately or stops supplying the supply current. Thus, the sensorless type brushless DC motor 100 stops rotating and immediately halts at its position.

The current controller part 320 may include a multiphase inverter 310. The multiphase inverter 310 is the part that changes the phase of each current so that a current with a different phase is transferred to the U-phase, V-phase, and W-phase coils, when a supply current or stop current is outputted from the current controller part 320 to the sensorless type brushless DC motor 100.

The current controller part 320 is the first to activate and rotate the sensorless type brushless DC motor 100 when there is an input from the user on the number of revolutions.

By means of a control apparatus according to a preferred embodiment of the invention, it is possible to control the sensorless type brushless DC motor 100 to rotate by the number of revolutions desired by the user.

It is to be appreciated that each component of the invention may be combined or separated to perform the functions as set forth above, without departing from the spirit of the invention.

Figure 4:
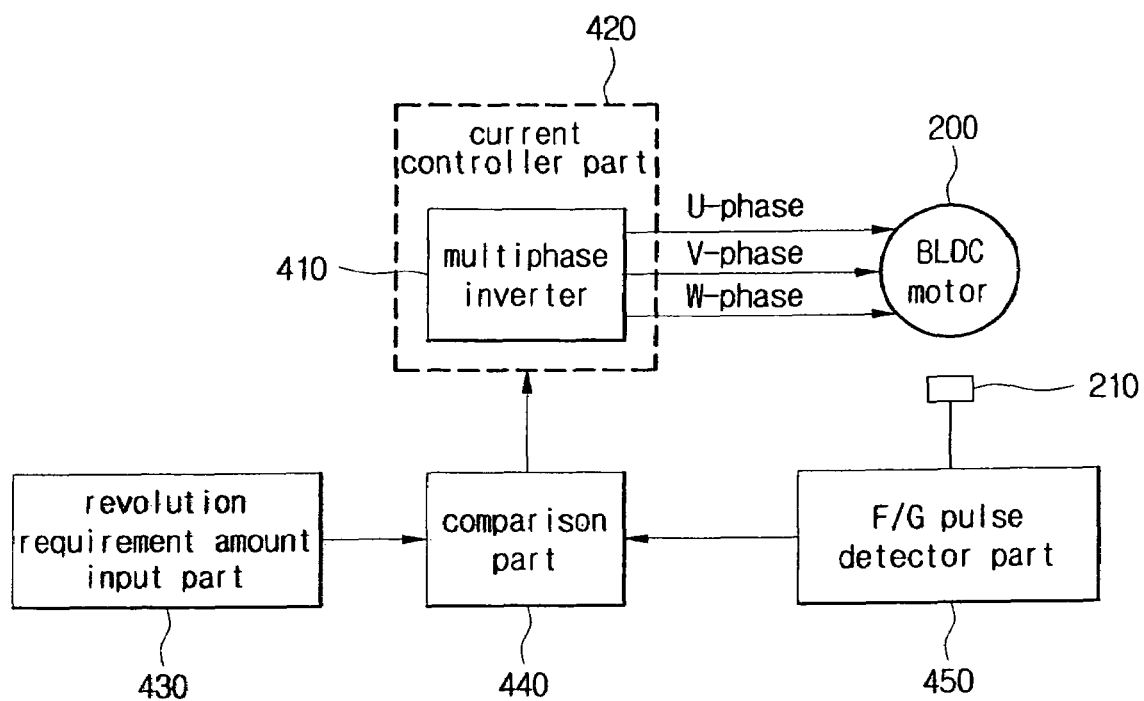
FIG. 4 is a schematic diagram illustrating a control apparatus of a sensor type brushless DC motor according to a preferred embodiment of the invention.

FIG. 4 is a schematic diagram illustrating a control apparatus of a sensor type brushless DC motor according to a preferred embodiment of the invention. As shown in FIG. 4, the control apparatus comprises a sensor type brushless DC motor 200, a current controller part 420, a revolution requirement amount input part 430, a comparison part 440, and an F/G pulse detector part 450.

As illustrated in FIG. 2, the sensor type brushless DC motor 200 comprises a stator 120 and a rotor 130 and uses the multiphase supply current supplied from the current controller part 320 to rotate the rotor 130 according to Fleming's Left Hand Rule. The magnetic sensor 210 generates F/G pulses according to the rotation of the rotor 130. The sensorless brushless DC motor can be realized in various forms, for example with the stator 120 receiving a pairs of three-phase supply currents, and the rotor 130 having b pairs of the two poles, etc.

The explanations below will be based on the regular three-phase bipolar form shown in FIG. 2. However, it is to be appreciated that the scope of the invention is not limited to this case.

The F/G pulse detector part 450 corresponds to the rotation detector part. The F/G pulse detector part 450 detects the F/G pulses generated from the sensor type brushless DC motor

200. An F/G pulse is generated once whenever the magnetic sensor 210 faces the N pole and the S pole once respectively due to the rotation of the rotor 130. Therefore, in the present example, one F/G pulse is generated due to one revolution of the rotor 130.

The F/G pulse detector part 450 increases a measured F/G pulse number with each detection of an F/G pulse and calculates the measured F/G pulse number as the number of F/G pulses measured up to the present. Then, it is preferable that when the sensor type brushless DC motor 200 is stopped, the measured F/G pulse number is reset to its initial value, so that when the sensor type brushless DC motor 200 is rotated again, it is increased from the beginning to count a new measured F/G pulse number.

The revolution requirement amount input part 330 receives the required number of revolutions of the sensor type brushless DC motor 200 as input from the user. With the sensor type brushless DC motor 200 illustrated in FIG. 2, one generation of F/G pulse is sensed with one revolution. Thus, the revolution requirement amount input part 330 receives the required number of revolutions as input and converts it to a required F/G pulse number for comparing by the comparison part 340. The required F/G pulse number is equal to (the inputted number of revolutions)×(the total number of F/G pulses currently sensed during one revolution of the sensor type brushless DC motor). Other formulas may also be used.

The above conversion may be performed by the comparison part 340, to which the number of revolutions is inputted, and not the revolution requirement amount input part 330.

The comparison part 340 receives the measured F/G pulse number as input from the F/G pulse detector part 450, receives the required F/G pulse number as input from the revolution requirement amount input part 330, and compares the two values.

The current controller part 320 receives the comparison result from the comparison part 340 and supplies to the sensor type brushless DC motor 200 a supply current which controls the rotation of the sensor type brushless DC motor 200.

If the measured F/G pulse number is smaller than the required F/G pulse number according to the comparison results from the comparison part 340, then the sensor type brushless DC motor 200 has not yet rotated up to the requirement of the user, so that the current controller part 320 supplies a supply current to the sensor type brushless DC motor 200 that makes the sensor type brushless DC motor 200 continue to rotate.

If the measured F/G pulse number is greater than or equal to the required F/G pulse number according to the comparison results from the comparison part 340, then the sensor type brushless DC motor 200 has rotated up the requirement of the user, so that the current controller part 320 either supplies a stop current that makes the sensor type brushless DC motor 200 stop immediately or stops supplying the supply current. Thus, the sensor type brushless DC motor 200 stops rotating and immediately halts at its position.

The current controller part 320 may include a multiphase inverter 310. The multiphase inverter 310 is the part that changes the phase of each current so that a current with a different phase is transferred to the U-phase, V-phase, and W-phase coils, when a supply current or stop current is outputted from the current controller part 320 to the sensor type brushless DC motor 200.

The current controller part 320 is the first to activate and rotate the sensor type brushless DC motor 200 when there is an input from the user on the number of revolutions.

By means of a control apparatus according to another preferred embodiment of the invention, it is possible to control the sensor type brushless DC motor 100 to rotate by the number of revolutions desired by the user.

It is to be appreciated that each component of the invention may be combined or separated to perform the functions as set forth above, without departing from the spirit of the invention.

Figure 5:
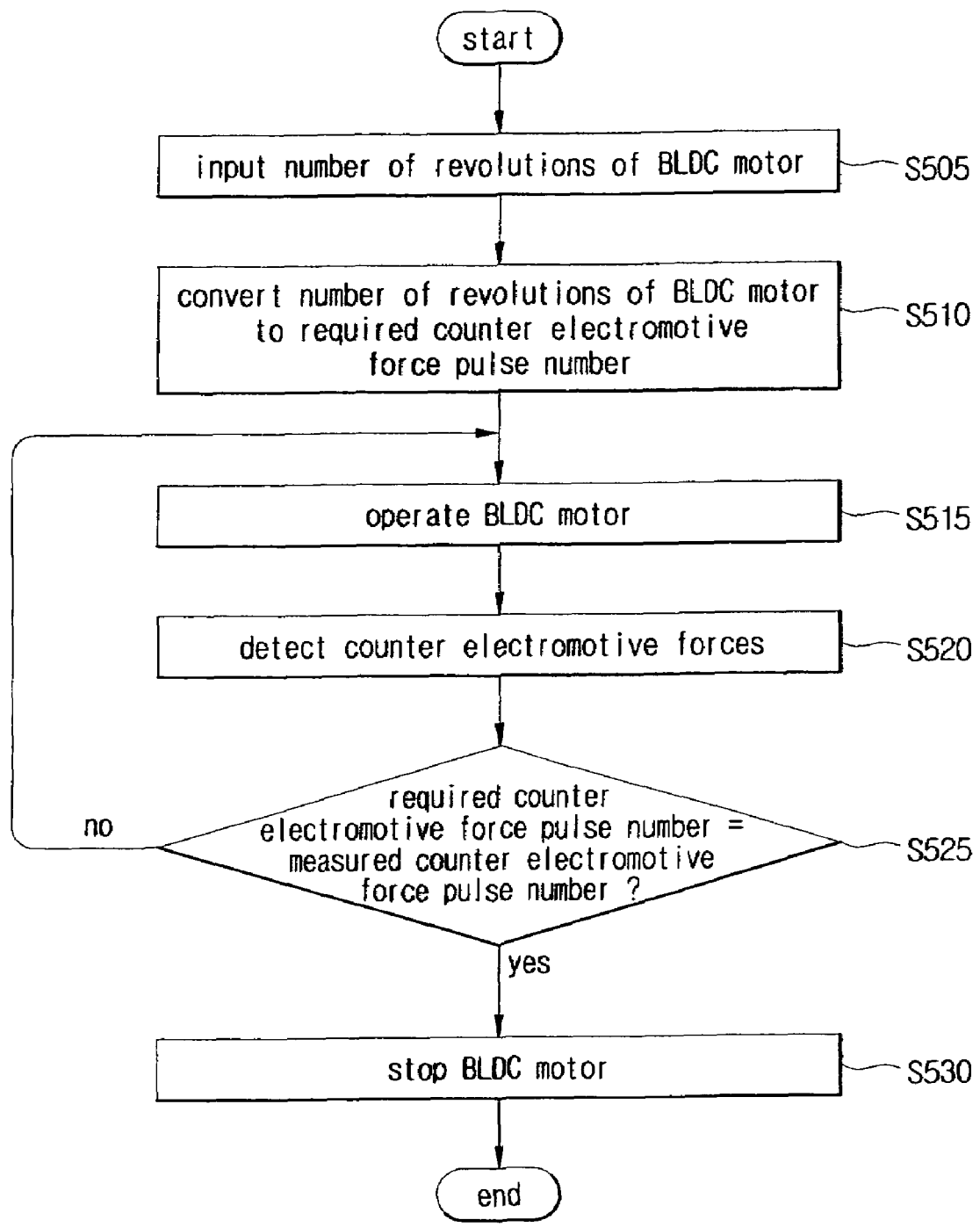
FIG. 5 is a flowchart illustrating a control method of the sensorless type brushless DC motor 100 shown in FIG. 1 according to a preferred embodiment of the invention.

FIG. 5 is a flowchart illustrating a control method of the sensorless type brushless DC motor 100 shown in FIG. 1 according to a preferred embodiment of the invention.

As shown in FIG. 5, the user inputs the number of revolutions required of the sensorless type brushless DC motor 100 through the revolution requirement amount input part 330 in operation S505. Here, it is preferable that the measured counter electromotive force pulse number of the counter electromotive force detector part 350 be set to its default value.

In operation S510, the revolution requirement amount input part 330 converts the inputted number of revolutions to a required counter electromotive force pulse number by a formula established according to the characteristics of the sensorless type brushless DC motor 100. The required counter electromotive force pulse number may be equal to (the inputted number of revolutions)×(the number of counter electromotive forces sensed during one revolution). Other formulas may also be used. The above conversion may be performed by a comparison part 340, to which the number of revolutions is inputted, and not the revolution requirement amount input part 330.

In operation S515, the current controller part 320 first activates and rotates the sensorless type brushless DC motor 100 when there is an input from the user on the number of revolutions.

In operation S520, the counter electromotive force detector part 350 detects the counter electromotive forces generated due to the rotation of the sensorless type brushless DC motor 100, and calculates the measured counter electromotive force pulse number generated and measured up the present.

In operation S525, the comparison part 340 compares the required counter electromotive force pulse number and the measured counter electromotive force pulse number.

If the comparison result shows the measured counter electromotive force pulse number to be equal to the required counter electromotive force pulse number, then the sensorless type brushless DC motor 100 has rotated up to the requirement of the user, and the process continues to operation S530. The current controller part 320 either supplies a stop current that makes the sensorless type brushless DC motor 100 stop immediately or stops supplying the supply current. Thus, the sensorless type brushless DC motor 100 stops rotating and immediately halts at its position.

However, if the comparison result shows the measured counter electromotive force pulse number to be smaller than the required counter electromotive force pulse number, then the sensorless type brushless DC motor 100 has not yet rotated up to the requirement of the user, so that the process returns to operation S515 wherein the current controller part 320 supplies a supply current to the sensorless type brushless DC motor 100 that makes the sensorless type brushless DC motor 100 continue to rotate. Then, operations S515 to S525 are repeated.

Figure 6:
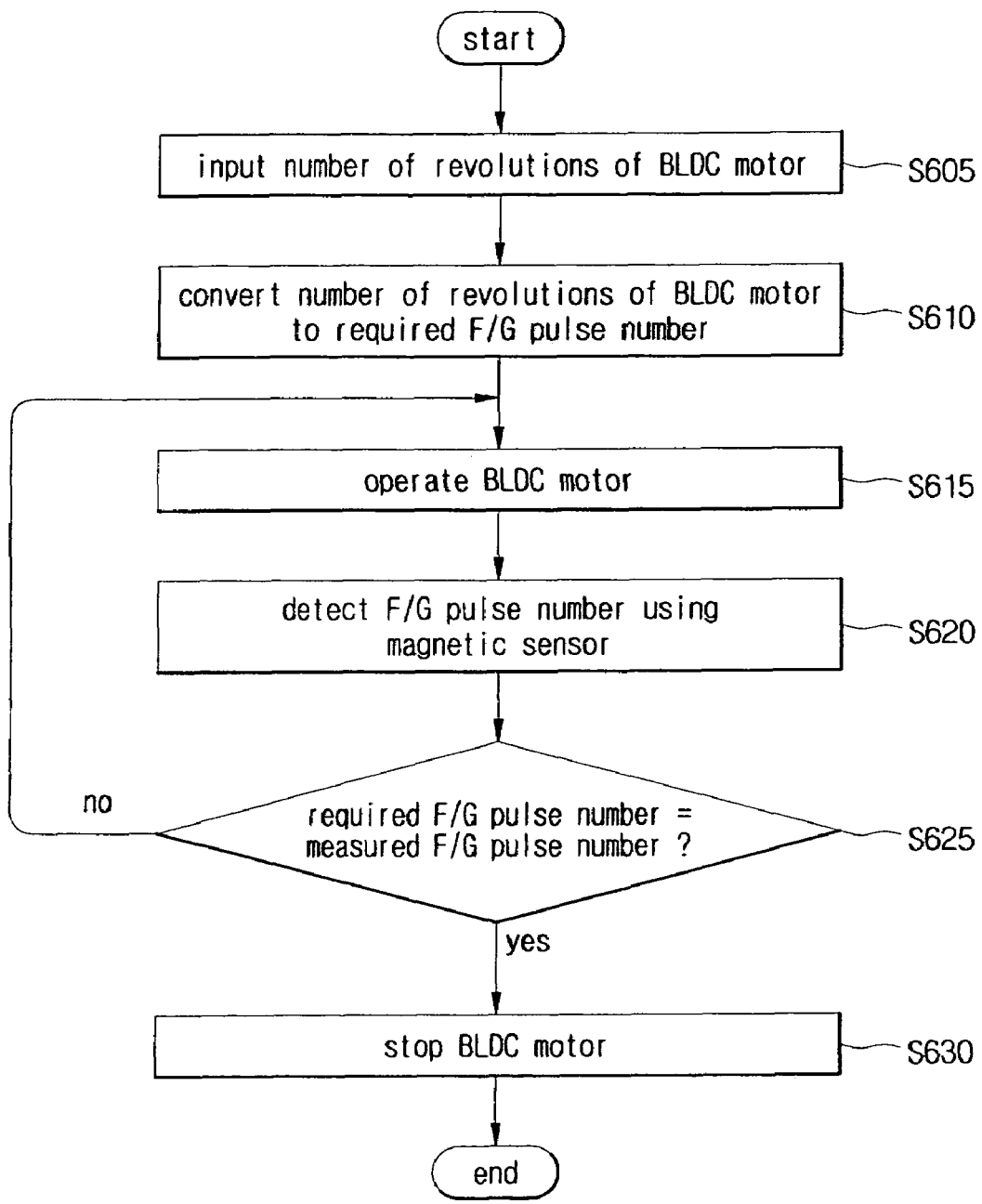
FIG. 6 is a flowchart illustrating a control method of the sensor type brushless DC motor 200 shown in FIG. 2 according to another preferred embodiment of the invention.

FIG. 6 is a flowchart illustrating a control method of the sensor type brushless DC motor 200 shown in FIG. 2 according to another preferred embodiment of the invention.

As shown in FIG. 6, the user inputs the number of revolutions required of the sensor type brushless DC motor 200 through the revolution requirement amount input part 430 in operation S605. Here, it is preferable that the measured F/G pulse number of the F/G detector part 450 be set to its default value.

In operation S610, the revolution requirement amount input part 430 converts the inputted number of revolutions to a required F/G force pulse number by a formula established according to the characteristics of the sensor type brushless DC motor 200. The required F/G pulse number may be equal to (the inputted number of revolutions)×(the number of F/G pulses sensed during one revolution). Other formulas may also be used. The above conversion may be performed by a comparison part 440, to which the number of revolutions is inputted, and not the revolution requirement amount input part 430.

In operation S615, the current controller part 420 first activates and rotates the sensor type brushless DC motor 200 when there is an input from the user on the number of revolutions.

In operation S620, the F/G pulse detector part 450 detects the F/G pulses generated due to the rotation of the sensor type brushless DC motor 200, and calculates the measured F/G pulse number generated and measured up the present.

In operation S625, the comparison part 440 compares the required F/G pulse number and the measured F/G pulse number.

If the comparison result shows the measured F/G pulse number to be equal to the required F/G pulse number, then the sensor type brushless DC motor 200 has rotated up to the requirement of the user, and the process continues to operation S630. The current controller part 420 either supplies a stop current that makes the sensor type brushless DC motor 200 stop immediately or stops supplying the supply current. Thus, the sensor type brushless DC motor 200 stops rotating and immediately halts at its position.

However, if the comparison result shows F/G pulse number to be smaller than the required F/G pulse number, then the sensor type brushless DC motor 200 has not yet rotated up to the requirement of the user, so that the process returns to operation S615 wherein the current controller part 420 supplies a supply current to the sensor type brushless DC motor 200 that makes the sensor type brushless DC motor 200 continue to rotate. Then, operations S615 to S625 are repeated.

As described above, control of a specified number of revolutions can be provided using a brushless DC motor control apparatus and control method thereof according to the present invention.

Also, the number of revolutions can be controlled through a digitalized method by detecting and counting counter electromotive forces on a sensorless type brushless DC motor.

Also, the number of revolutions can be controlled through a digitalized method by detecting and counting F/G pulses from a sensor type brushless DC motor.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A brushless DC motor control apparatus controlling the number of revolutions of a brushless DC motor having a rotor with n poles (where n is a natural number) that perform an operation of rotating or stopping due to a supply current with m phases (where m is a natural number) supplied to a stator, comprising:
    a rotation detector part, which counts the number of revolution pulses from the brushless DC motor caused by the rotation of the rotor;
    a revolution requirement amount input part, which receives the number of revolutions of the brushless DC motor as input and converts it to a corresponding revolution requirement amount;
    a comparison part, which compares the number of revolution pulses and the revolution requirement amount; and
    a current controller part, which controls the supply current supplied to the brushless DC motor according to comparison results from the comparison part,
    wherein the supply current is classified into a first supply current and a second supply current, and
    wherein the brushless DC motor performs an operation of rotating at a constant speed when the first supply current is supplied and performs an operation of stopping when the second supply current is supplied and when the number of revolution pulses is equal to the revolution requirement amount.

2. The brushless DC motor control apparatus of claim 1, wherein the current controller part supplies the first supply current so as to rotate the brushless DC motor when the number of revolution pulses is smaller than the revolution requirement amount.

3. The brushless DC motor control apparatus of claim 1, wherein the brushless DC motor is a sensorless type, and
    the rotation detector part counts the total number of detections of counter electromotive force generated on a multiphase coil of the stator as the number of revolution pulses.

4. The brushless DC motor control apparatus of claim 3, wherein the revolution requirement amount is (the number of revolutions)×(the total number of counter electromotive forces generated during one revolution of the brushless DC motor).

5. The brushless DC motor control apparatus of claim 1, wherein the brushless DC motor is a sensor type, and
    the rotation detector part comprises a magnetic sensor, which senses F/G pulses generated by the rotation of the rotor, and counts the total number of detections of the F/G pulses as the number of revolution pulses.

6. The brushless DC motor control apparatus of claim 3, wherein the revolution requirement amount is (the number of revolutions)×(the total number of F/G pulses generated during one revolution of the brushless DC motor).

7. The brushless DC motor control apparatus of claim 1, wherein the current controller part supplies the supply current which activates the brushless DC motor after the number of revolutions is inputted to the revolution requirement amount input part.

8. The brushless DC motor control apparatus of claim 1, wherein the current controller part comprises a multiphase inverter for supplying the supply current with m phases to the brushless DC motor.

9. A method of controlling a brushless DC motor having a rotor with n poles (where n is a natural number) that perform an operation of rotating or stopping due to a supply current with m phases (where m is a natural number) supplied to a slot of a stator, comprising:
    (a) receiving as input the number of revolutions of the brushless DC motor;
    (b) converting the number of revolutions to a revolution requirement amount;
    (c) supplying a first supply current to the brushless DC motor;
    (d) counting the number of revolution pulses caused by the rotation of the brushless DC motor;
    (e) comparing the revolution requirement amount and the number of revolution pulses; and (f) repeating the counting (operation d) and the comparing (operation e) until the number of revolution pulses is equal to the revolution requirement amount; and (g) supplying a second supply current to the brushless DC motor when the number of revolution pulses is equal to the revolution requirement amount; and wherein the brushless DC motor performs an operation of rotating at a constant speed when the first supply current is supplied and performs an operation of stopping when the second supply current is supplied.

10. The method of claim 9, wherein:
the brushless DC motor is a sensorless type; and
the counting of the number of revolution pulses comprises counting the total number of detections of counter electromotive force generated on a multiphase coil of the stator as the number of revolution pulses.

11. The method of claim 10, wherein the revolution requirement amount is (the number of revolutions)×(the total number of counter electromotive forces generated during one revolution of the brushless DC motor).

12. The method of claim 9, wherein:
the brushless DC motor is a sensor type; and
the counting of the number of revolution pulses comprises counting the total number of detections of the F/G pulses generated on a multiphase coil of the stator as the number of revolution pulses.

13. The method of claim 12, wherein the revolution requirement amount is (the number of revolutions)×(the total number of F/G pulses generated during one revolution of the brushless DC motor).

14. A brushless DC motor control apparatus comprising:
a rotation detector part to count rotation of a rotor of a brushless DC motor to generate a number of revolution pulses;

an input part to receive a number of revolutions of the rotor of the brushless DC motor;

a comparison part to compare the number of revolution pulses and the received number of revolutions; and a current controller part to control current supplied to the brushless DC motor according to a comparison result of the comparison unit, wherein the supply current is classified into a first supply current and a second supply current, and wherein the brushless DC motor performs an operation of rotating at a constant speed when the first supply current is supplied and performs an operation of stopping when the second supply current is supplied and when the number of revolution pulses is equal to the received number of revolutions.

* * * * *